(12) United States Patent
Feller et al.

(10) Patent No.: US 11,135,790 B2
(45) Date of Patent: Oct. 5, 2021

(54) METHOD OF MAKING THREE-DIMENSIONAL OBJECT BY DELIVERING REACTIVE COMPONENT FOR SUBSEQUENT CURE

(71) Applicant: CARBON, INC., Redwood City, CA (US)

(72) Inventors: Bob E. Feller, Mountain View, CA (US); Kai Chen, Sunnyvale, CA (US); Jason P. Rolland, San Carlos, CA (US)

(73) Assignee: Carbon, Inc., Redwood City, CA (US)

( * ) Notice: Subject to any disclaimer, the term of this patent is extended or adjusted under 35 U.S.C. 154(b) by 239 days.

(21) Appl. No.: 16/349,169

(22) PCT Filed: Nov. 17, 2017

(86) PCT No.: PCT/US2017/062135
§ 371 (c)(1),
(2) Date: May 10, 2019

(87) PCT Pub. No.: WO2018/094131
PCT Pub. Date: May 24, 2018

(65) Prior Publication Data
US 2019/0283315 A1    Sep. 19, 2019

Related U.S. Application Data

(60) Provisional application No. 62/424,583, filed on Nov. 21, 2016.

(51) Int. Cl.
*B29C 71/00* (2006.01)
*B29C 64/124* (2017.01)
(Continued)

(52) U.S. Cl.
CPC ........ *B29C 71/0009* (2013.01); *B29C 64/129* (2017.08); *B29C 64/135* (2017.08);
(Continued)

(58) Field of Classification Search
CPC .............. B29C 64/188; B29C 71/0009; B29C 2071/0018
See application file for complete search history.

(56) References Cited

U.S. PATENT DOCUMENTS

| | | | |
|---|---|---|---|
| 5,234,636 A * | 8/1993 | Hull ...................... | B05D 1/045 264/401 |
| 5,248,456 A | 9/1993 | Evans, Jr. et al. | |

(Continued)

FOREIGN PATENT DOCUMENTS

| | | |
|---|---|---|
| CN | 103571211 | 2/2014 |
| CN | 104093319 A | 10/2014 |

(Continued)

OTHER PUBLICATIONS

Chinese Office Action corresponding to CN 201780067920.7; dated Sep. 24, 2020 (21 pages, including English translation).

(Continued)

*Primary Examiner* — Atul P. Khare
(74) *Attorney, Agent, or Firm* — Myers Bigel, P.A.

(57) ABSTRACT

Provided herein are methods of forming a three-dimensional object, which may be carried out by: (a) forming a three-dimensional intermediate by polymerization of a polymerizable liquid in an additive manufacturing process, the polymerizable liquid comprising a light polymerizable component; then (b) contacting at least a portion of the three-dimensional intermediate to a penetrant fluid, the penetrant fluid carrying a solidifiable component, the contacting step carried out under conditions in which the solidifiable component penetrates into the three-dimensional intermediate; (c) optionally but preferably separating the three-dimensional intermediate from the penetrant fluid; and then (d) solidifying and/or curing the solidifiable component in the three-dimensional intermediate to form the three-dimensional object.Provided herein are methods of forming a (Continued)

three-dimensional object, which may be carried out by: (a) forming a three-dimensional intermediate by polymerization of a polymerizable liquid in an additive manufacturing process, the polymerizable liquid comprising a light polymerizable component; then (b) contacting at least a portion of the three-dimensional intermediate to a penetrant fluid, the penetrant fluid carrying a solidifiable component, the contacting step carried out under conditions in which the solidifiable component penetrates into the three-dimensional intermediate; (c) optionally but preferably separating the three-dimensional intermediate from the penetrant fluid; and then (d) solidifying and/or curing the solidifiable component in the three-dimensional intermediate to form the three-dimensional object.

31 Claims, 2 Drawing Sheets

(51) Int. Cl.
| | |
|---|---|
| *B29C 64/264* | (2017.01) |
| *B29C 64/188* | (2017.01) |
| *B29C 64/295* | (2017.01) |
| *B29C 64/129* | (2017.01) |
| *B29C 64/135* | (2017.01) |
| B29C 64/30 | (2017.01) |
| B33Y 10/00 | (2015.01) |
| B33Y 70/00 | (2020.01) |
| B33Y 99/00 | (2015.01) |
| B22F 10/10 | (2021.01) |

(52) U.S. Cl.
CPC .......... *B29C 64/188* (2017.08); *B29C 64/264* (2017.08); *B29C 64/295* (2017.08); *B22F 10/10* (2021.01); *B29C 2071/0018* (2013.01); *B33Y 10/00* (2014.12); *B33Y 70/00* (2014.12); *B33Y 99/00* (2014.12)

(56) References Cited

U.S. PATENT DOCUMENTS

| | | | |
|---|---|---|---|
| 5,629,133 A | 5/1997 | Wolf et al. | |
| 5,674,921 A | 10/1997 | Regula et al. | |
| 5,679,719 A | 10/1997 | Klemarczyk et al. | |
| 5,695,708 A | 12/1997 | Karp et al. | |
| 6,309,797 B1 | 10/2001 | Grinevich et al. | |
| 6,579,917 B1 * | 6/2003 | Noguchi | B33Y 40/00 |
| | | | 522/170 |
| 6,713,125 B1 | 3/2004 | Sherwood et al. | |
| 7,300,619 B2 * | 11/2007 | Napadensky | B33Y 70/00 |
| | | | 264/401 |
| 7,608,672 B2 | 10/2009 | Hachikian | |
| 8,349,233 B2 * | 1/2013 | Ederer | B29C 71/0009 |
| | | | 264/109 |
| 8,765,045 B2 * | 7/2014 | Zinniel | B33Y 40/00 |
| | | | 264/341 |
| 9,205,601 B2 | 12/2015 | DeSimone et al. | |
| 9,211,678 B2 | 12/2015 | DeSimone et al. | |
| 9,216,546 B2 | 12/2015 | DeSimone et al. | |
| 9,360,757 B2 | 6/2016 | DeSimone et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 9,708,440 B2 | 7/2017 | Das et al. | |
| 9,777,097 B2 | 10/2017 | Liu et al. | |
| 9,982,164 B2 | 5/2018 | Rolland et al. | |
| 10,016,938 B2 | 7/2018 | DeSimone et al. | |
| 10,093,064 B2 | 10/2018 | DeSimone et al. | |
| 10,144,181 B2 | 12/2018 | DeSimone et al. | |
| 10,150,253 B2 | 12/2018 | DeSimone et al. | |
| 10,155,882 B2 | 12/2018 | Rolland et al. | |
| 10,240,066 B2 | 3/2019 | Rolland et al. | |
| 10,343,331 B2 * | 7/2019 | McCall | B33Y 10/00 |
| 10,350,823 B2 * | 7/2019 | Rolland | B33Y 50/00 |
| 10,500,786 B2 * | 12/2019 | Rolland | B29C 33/448 |
| 2003/0091833 A1 * | 5/2003 | Baumgart | C09J 201/025 |
| | | | 428/423.1 |
| 2003/0186035 A1 * | 10/2003 | Cruce | C04B 41/63 |
| | | | 428/292.4 |
| 2004/0052966 A1 * | 3/2004 | Wilke | C08G 18/8175 |
| | | | 427/508 |
| 2004/0157519 A1 * | 8/2004 | Goodell | B32B 5/24 |
| | | | 442/181 |
| 2004/0187714 A1 * | 9/2004 | Napadensky | B33Y 40/00 |
| | | | 101/35 |
| 2007/0172599 A1 * | 7/2007 | Lewis | B29C 70/58 |
| | | | 427/430.1 |
| 2007/0205528 A1 * | 9/2007 | Patel | G03F 7/0037 |
| | | | 264/16 |
| 2008/0131692 A1 * | 6/2008 | Rolland | B29C 33/3857 |
| | | | 428/336 |
| 2010/0105794 A1 * | 4/2010 | Dietliker | G03F 7/0045 |
| | | | 522/46 |
| 2012/0195994 A1 * | 8/2012 | El-Siblani | B29C 64/124 |
| | | | 425/174.4 |
| 2015/0322291 A1 * | 11/2015 | Salviato | C09D 11/101 |
| | | | 524/591 |
| 2016/0136889 A1 * | 5/2016 | Rolland | B29C 64/124 |
| | | | 264/1.27 |
| 2017/0327658 A1 * | 11/2017 | Moreau | B29C 64/188 |

FOREIGN PATENT DOCUMENTS

| | | | |
|---|---|---|---|
| DE | 102014102137 | 8/2015 | |
| EP | 0442071 | 4/1992 | |
| EP | 0525578 | 2/1993 | |
| EP | 0830641 | 3/1998 | |
| EP | 1341039 | 9/2003 | |
| EP | 1918316 | 5/2008 | |
| EP | 2224874 | 9/2010 | |
| JP | H02111528 | 4/1990 | |
| WO | 2001-026023 | 4/2001 | |
| WO | 2006-045002 | 4/2006 | |
| WO | 2007-087321 | 8/2007 | |
| WO | WO-2015046217 A1 * | 4/2015 | ............ B29C 73/02 |
| WO | 2015-077419 | 5/2015 | |
| WO | 2015-108574 | 7/2015 | |

OTHER PUBLICATIONS

Park et al., UV- and thermal-curing behaviors or dual-curable adhesives based on epoxy acrylate oligomers, International Journal of Adhesion and Adhesives, vol. 29, Issue 7, 2009, pp. 710-717.
International Search Report and Written Opinion corresponding to PCT/US2017/062135, dated Feb. 28, 2018, 12 pages.

* cited by examiner

METHOD OF MAKING THREE-DIMENSIONAL OBJECT BY DELIVERING REACTIVE COMPONENT FOR SUBSEQUENT CURE

RELATED APPLICATIONS

This application claims the benefit of U.S. provisional patent application Ser. No. 62/424,583, filed Nov. 21, 2016, the disclosure of which is incorporated by reference herein in its entirety.

FIELD OF THE INVENTION

The present invention concerns materials, methods and apparatus for the fabrication of solid three-dimensional objects from liquid materials, and objects so produced.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Generally referred to as "stereolithography," two particular techniques are known: one in which new layers are formed at the top surface of the growing object; the other in which new layers are formed at the bottom surface of the growing object. Examples of such methods include those given in U.S. Pat. No. 5,236,637 to Hull (see, e.g., FIGS. 3-4), U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al.

More recently, techniques referred to as "continuous liquid interface production" (or "CLIP") have been developed. These techniques enable the rapid production of three-dimensional objects in a layerless manner, by which the parts may have desirable structural and mechanical properties. See, e.g., J. DeSimone et al., PCT Application No. PCT/US2014/015486 (published as U.S. Pat. No. 9,211,678); PCT/US2014/015506 (published as U.S. Pat. No. 9,205,601), PCT/US2014/015497 (published as U.S. Pat. No 9,216,546), J. Tumbleston, et al., *Continuous liquid interface production of 3D Objects, Science* 347, 1349-1352 (published online 16 Mar. 2015), and R. Janusziewcz et al., Layerless fabrication with continuous liquid interface production, *Proc. Natl. Acad. Sci. USA* 113, 11703-11708 (Oct. 18, 2016).

Dual cure stereolithography resins suitable for stereolithography techniques (particularly for CLIP) are described in J. Rolland et al., PCT Applications PCT/US2015/036893 (see also US Patent Application Pub. No. US 2016/0136889), PCT/US2015/036902 (see also US Patent Application Pub. No. US 2016/0137838), PCT/US2015/036924 (see also US Patent Application Pub. No. US 2016/016077), and PCT/US2015/036946 (see also US Pat. No. 9,453,142). These resins usually include a first polymerizable system typically polymerized by light (sometimes referred to as "Part A") from which an intermediate object is produced, and also include at least a second polymerizable system ("Part B") which is usually cured after the intermediate object is first formed, and which imparts desirable structural and/or tensile properties to the final object. While making possible a still greater variety of structural and mechanical properties for objects produced by these methods, in some cases the incorporation of Part B in the resin may slow or complicate the initial stereolithography or CLIP fabrication of the intermediate.

Accordingly, there is a need for new methods for producing three-dimensional objects by additive manufacturing that have satisfactory structural properties, particularly where enhancing the speed of fabrication is desired.

SUMMARY OF THE INVENTION

A method of forming a three-dimensional object may be carried out by: (a) forming a three-dimensional intermediate (e.g., a non-porous intermediate) by polymerization of a polymerizable liquid in an additive manufacturing process (e.g., by stereolithography, such as by bottom-up or top-down three-dimensional fabrication), the polymerizable liquid comprising a light polymerizable component, the three-dimensional intermediate having the same shape as, or a shape to be imparted to, the three-dimensional object; then (b) contacting at least a portion of the three-dimensional intermediate to a penetrant fluid, the penetrant fluid carrying a solidifiable component, the contacting step carried out under conditions in which the solidifiable component penetrates into the three-dimensional intermediate (e.g., penetrates into polymerized or dense portions of the three-dimensional intermediate, and not merely into voids that may be formed in that intermediate); (c) optionally but preferably separating the three-dimensional intermediate from the penetrant fluid; and then (d) solidifying and/or curing the solidifiable component in the three-dimensional intermediate (e.g., within polymerized or dense portions of the three-dimensional intermediate, and not in voids that may have been formed in that intermediate) to form the three-dimensional object.

In some embodiments, the contacting step (b) is carried out under conditions in which the three-dimensional intermediate physically swells (e.g., increases in volume by at least 10, 20 or 30 percent, or more); and then the separating step (c) and/or the solidifying step (d) is carried out under conditions in which the three-dimensional intermediate physically shrinks (e.g., loses at least 60, 70 or 80 percent of the volume, up to 90, 95 or 99 percent of the volume, that had been gained by swelling during the contacting step).

In some embodiments, the three-dimensional intermediate is elastic during the forming step (e.g., has a Young's Modulus of 0.5 to 50 MPa; a tensile strength of 0.5 to 30 MPa; and/or a percent elongation at Break of 50 to 1000); and/or at least a portion (e.g., a major portion) of the intermediate is in the configuration of a lattice or mesh.

In some embodiments, the polymerizable liquid is viscous at room temperature (e.g., 25 degrees Centigrade, or from 15 or 20 to 30 degrees Centrigrade) (e.g., has a viscosity of 1,000, 2,000, 3,000, or 4,000 Centipoise, or more at room temperature).

In some embodiments, the method further includes heating the polymerizable liquid (e.g., to 30, 40, or 50 degrees Centigrade, or more) during the forming step by an amount sufficient to reduce the viscosity thereof (e.g., by 10, 20, or 30 percent, up to 60 or 80 percent, or more, compared to the viscosity of the polymerizable liquid at room temperature).

In some embodiments, the solidifying and/or curing step (d) is carried out by heating the three-dimensional intermediate (e.g. at a temperature of at least 40, 50, 60 or 80 degrees Centigrade, up to 140 or 160 Degrees Centigrade or more) for a time sufficient to produce the three-dimensional object.

In some embodiments, the forming step is carried out by bottom-up stereolithography, and preferably by continuous liquid interface production.

In some embodiments, the penetrant fluid comprises an organic solvent (e.g., a polar or non-polar, protic or aprotic, hydrophilic or hydrophobic, and/or aromatic or aliphatic, organic solvent, including but not limited to ketones such as acetone, alcohols such as ethanol and isopropanol, ethers such as tent-butyl methyl ether, etc.).

In some embodiments, the penetrant fluid comprises water (alone, or mixed with other ingredients such as organic solvent(s) as described above).

In some embodiments, the contacting step (b) is carried out at a temperature greater than ambient (room) temperature, and/or a pressure greater than atmospheric pressure.

In some embodiments, the penetrant fluid comprises a densified fluid (e.g., a liquid, a supercritical fluid, or a near-supercritical fluid).

In some embodiments, the penetrant fluid comprises carbon dioxide water (alone, or mixed with other ingredients such as organic solvent(s) and/or water, as described above).

In some embodiments, the solidifiable component is dissolved, dispersed, or suspended in the penetrant fluid.

In some embodiments, the light polymerizable component comprises monomers and/or prepolymers that can be polymerized by exposure to actinic radiation or light. For example, the monomers and/or prepolymers may comprise reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments, the polymerizable liquid and the three-dimensional intermediate comprise a first member of a reactive pair (e.g., a polyisocyanate), and the solidifiable component comprises a second member of the reactive pair (e.g., a polyol and/or a polyamine), optionally but preferably wherein neither the first member nor the second member is sufficient to solidify and/or cure in the absence of the other. For example, in some embodiments, (i) the first member of the reactive pair comprises a polyisocyanate and the second member of the reactive pair comprises a polyol, polyamine, and/or polycarboxylic acid; (ii) the first member of the reactive pair comprises an epoxy and the second member of the reactive pair comprises a polyol and/or polyamine; or (iii) the first member of the reactive pair comprises an oxetane and the second member of the reactive pair comprises a polyamine.

In some embodiments, the solidifiable component comprises a precursor to: a polyurethane, polyurea, or copolymer thereof; a silicone resin; an epoxy resin; a cyanate ester resin; a natural rubber; a ring-opening metathesis polymerization resin; or a click chemistry resin.

In some embodiments, the solidifying and/or curing step (c) is carried out under conditions in which the intermediate degrades and forms a constituent necessary for the polymerization of the solidifiable component.

In some embodiments, the solidifiable component is included in the penetrant fluid in an amount of from 1, 2 or 3 percent by weight, up to 10, 20, 30 or 40 percent by weight.

In some embodiments, the contacting step comprises contacting all of the intermediate to the penetrant fluid (e.g., by complete immersion); in other embodiments, the contacting step comprises contacting only a portion (e.g., a major portion; a portion excluding supports) of the intermediate to the penetrant fluid.

In some embodiments, the contacting step is carried out while the object is adhered to a carrier platform; and optionally but preferably wherein the solidifying and/or curing step (d) is carried out after the object is removed from the carrier platform.

In some embodiments, the solidifying and/or curing step (d) is carried out by: (i) heating and/or microwave irradiating the solidifiable component; (ii) irradiating the solidifiable component with light at a wavelength different from that of the light in the irradiating step (c);
(iii) contacting the solidifiable component to water; and/or (iv) contacting the solidifiable component to a catalyst.

In some embodiments, the three-dimensional object comprises a polymer blend, interpenetrating polymer network, semi-interpenetrating polymer network, or sequential interpenetrating polymer network formed from the first component and the second component.

In some embodiments, the three-dimensional object is (i) rigid, (ii) semi-rigid and flexible, or (iii) elastomeric.

In some embodiments, the three-dimensional object is (i) uniform or symmetric in shape, or (ii) irregular or asymmetric in shape.

In some embodiments, the polymerization of the polymerizable liquid is exothermic.

In some embodiments, the forming step (a) is carried out by: (i) providing a carrier and an optically transparent member having a build surface, the carrier and the build surface defining a build region therebetween; (ii) filling the build region with the polymerizable liquid; and (iii) irradiating the build region with light through the optically transparent member to form a solid polymer scaffold from the polymerizable component and also advancing the carrier and the build surface away from one another to form the three-dimensional intermediate. In some such embodiments, the irradiating and/or the advancing steps are carried out while also concurrently: continuously maintaining a dead zone of polymerizable liquid in contact with the build surface, and continuously maintaining a gradient of polymerization zone between the dead zone and the solid polymer and in contact with each thereof, the gradient of polymerization zone comprising the first component in partially cured form (the two together sometimes also referred to as a "continuous liquid interface"). In some such embodiments, the optically transparent member comprises a semipermeable member, and the continuously maintaining a dead zone is carried out by feeding an inhibitor of polymerization through the optically transparent member, thereby creating a gradient of inhibitor in the dead zone and optionally in at least a portion of the gradient of polymerization zone. For example, in some embodiments, the optically transparent member comprises a fluoropolymer.

In some embodiments, the polymerizable component comprises a free radical polymerizable liquid and the inhibitor comprises oxygen; or the polymerizable component comprises an acid-catalyzed or cationically polymerizable liquid, and the inhibitor comprises a base.

In some embodiments, the three-dimensional object is fabricated at a speed of at least 20 or 30 centimeters per hour.

Infiltrants for reinforcing porous intermediate substrates produced by selective laser sintering have been suggested in U.S. Pat. No. 7,608,672 to Hachikian (Illinois Tool Works) (see also PCT Applications WO 2007087321 to Lewis and Zopf and WO 2015108574 to Govyadinov et al. (Hewlett Packard)), but not for swelling the dense portions of intermediate objects (rather, for simply filling voids therein), not for application to intermediate objects produced by stereolithography, and particularly not for application to intermediate objects produced by continuous liquid interface production.

Rolland et al., supra, in their discussion of dual cure resins, briefly state that "Part B could be infused into the object made during the 3D printing process in a subsequent step." (see, e.g., U.S. Pat. No. 9,453,142 at column 30, lines 5-10). Infusion of additional materials has, however, heretofore been used to fill empty voids in the object made, and not to penetrate into the dense or solid portions of the object made, as described herein. Infusion of a single Part B component that is insufficient by itself to solidify in a second cure, is neither suggested nor described. Finally, a problem with inclusion of all components of Part B in a wash liquid for a subsequent infusion step may be limited or variable pot-life of the wash liquid, potentially resulting in further variability or inconsistency in the mechanical properties of the resulting product.

U.S. Pat. No. 5,248,456 to Evans (3D Systems) discusses the swelling of parts produced by stereolithography (see, e.g., FIGS. 8a-8h and associated text), but identifies swelling as an event to be avoided in the course of cleaning such parts.

Non-limiting examples and specific embodiments of the present invention are explained in greater detail in the drawings herein and the specification set forth below. The disclosures of all United States Patent references cited herein are to be incorporated herein by reference in their entirety.

DETAILED DESCRIPTION OF ILLUSTRATIVE EMBODIMENTS

Figure 1:
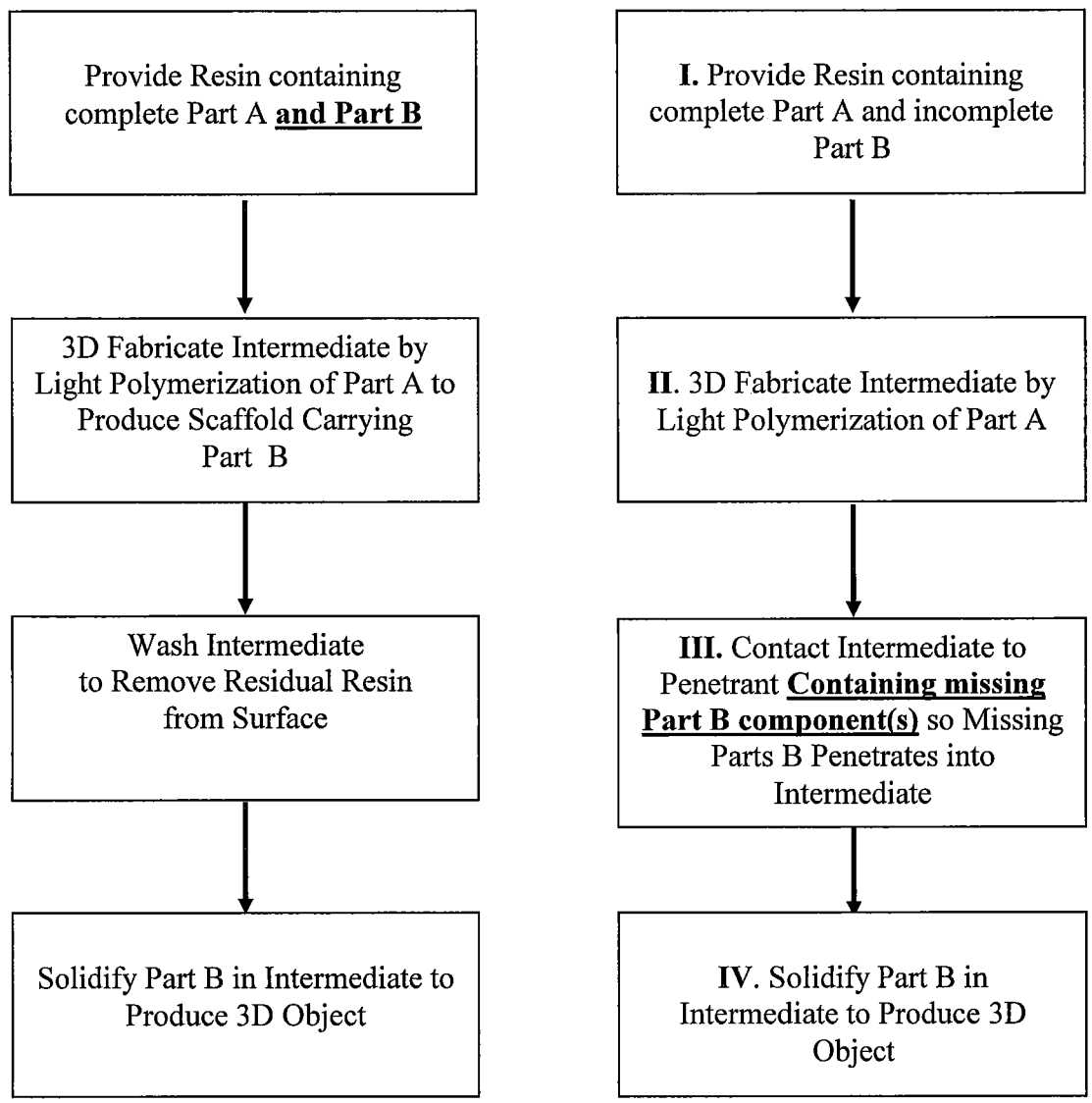
FIG. 1 schematically illustrates a prior dual cure process (left column) and dual cure processes as described herein (right column).

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, components and/or groups or combinations thereof, but do not preclude the presence or addition of one or more other features, integers, steps, operations, elements, components and/or groups or combinations thereof.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

"Shape to be imparted to" refers to the case where the shape of the intermediate object slightly changes between formation thereof and forming the subsequent three-dimensional product, typically by shrinkage (e.g., up to 1, 2 or 4 percent by volume), expansion (e.g., up to 1, 2 or 4 percent by volume), removal of support structures, or by intervening forming steps (e.g., intentional bending, stretching, drilling, grinding, cutting, polishing, or other intentional forming after formation of the intermediate product, but before formation of the subsequent three-dimensional product). As noted above, the three-dimensional intermediate may also be washed, if desired, before further curing, and/or before, during, or after any intervening forming steps.

"Hydrocarbyl" as used herein refers to a bifunctional hydrocarbon group, which hydrocarbon may be aliphatic, aromatic, or mixed aliphatic and aromatic, and optionally containing one or more (e.g. 1, 2, 3, or 4) heteroatoms (typically selected from N, O, and S). Such hydrocarbyl groups may be optionally substituted (e.g., with additional isocyanate groups) and may contain from 1, 2, or 3 carbon atoms, up to 6, 8 or 10 carbon atoms or more, and up to 40, 80, or 100 carbon atoms or more.

"Hard-segment" and "soft-segment" as used herein derive from the morphology of elastomeric polymers, which can contain distinct phase separated regions. Such regions can be detected by thermoanalysis techniques and distinguished by, for example, glass transition temperatures. Generally, soft-segments of the polymer can be considered as having glass transition temperatures below room temperature whilst hard-segments can be considered as having glass transition temperatures above room temperature or even melting points if a crystallite. It is the current opinion (and hence their classification) that "soft-segment" prepolymers or resin constituents are associated with the formation of the soft-segment phase of the product and conversely that hard-segment prepolymers or resin constituents are associated with the hard-segment phase of the product. Structure-property relationships of hard- and soft-segment phases are described for example by Redman in "Developments in Polyurethanes-I" J. M. Buist Ed., Elsevier, London—published 1978. See, e.g., U.S. Pat. No. 5,418,259 (Dow).

Heating may be active heating (e.g., in an oven, such as an electric, gas, or solar oven), or passive heating (e.g., at ambient (room) temperature). Active heating will generally be more rapid than passive heating and in some embodiments is preferred, but passive heating—such as simply maintaining the intermediate at ambient (room) temperature for a sufficient time to effect further cure—is in some embodiments preferred.

"Isocyanate" as used herein includes diisocyanate, polyisocyanate, and branched isocyanate.

"Diisocyanate" and "polyisocyanate" are used interchangeably herein and refer to aliphatic, cycloaliphatic, and aromatic isocyanates that have at least 2, or in some embodiments more than 2, isocyanate (NCO) groups per molecule, on average. In some embodiments, the isocyanates have, on average, 2.1, 2.3, 2.5, 2.8, or 3 isocyanate groups per molecule, up to 6, 8 or 10 or more isocyanate groups per molecule, on average. In some embodiments, the isocyanates may be a hyperbranched or dendrimeric isocyanate (e.g., containing more than 10 isocyanate groups per molecule, on average, up to 100 or 200 more more isocyanate groups per molecule, on average). Common examples of suitable isocyanates include, but are not limited to, methylene diphenyl diisocyanate (MDI), toluene diisocyanate (TDI)), para-phenyl diisocyanate (PPDI), 4,4'-dicyclohexyl-methane-diisocyanate (HMDI), hexamethylene diisocyanate (HDI), isophorone diisocyanate (IPDI), triphenylmethane-4,4'4"-triisocyanate, tolune-2,4,6- triyl triisocyanate, 1,3,5-triazine-2,4,6-triisocyanate, ethyl ester L-lysine triisocyanate, etc., including combinations thereof. Numerous additional examples are known and are described in, for example, U.S. Pat. Nos. 9,200,108; 8,378,053; 7,144,955; 4,075,151, 3,932,342, and in US Patent Application Publication Nos. US 20040067318 and US 20140371406, the disclosures of all of which are incorporated by reference herein in their entirety.

"Branched isocyanate" as used herein refers to diisocyanates or polyisocyanates as described above that have 3 or more isocyanate groups per molecule, or (with respect to mixtures of different isocyanates) more than 2 isocyanate groups per molecule, on average. In some embodiments, the branched isocyanates have, on average, 2.1, 2.3, 2.5, 2.8, or 3 isocyanate groups per molecule, up to 6, 8 or 10 or more isocyanate groups per molecule, on average. In some embodiments, the isocyanates may be a hyperbranched or dendrimeric isocyanates as discussed above (e.g., containing more than 10 isocyanate groups per molecule, on average, up to 100 or 200 more more isocyanate groups per molecule, on average).

The present invention is schematically illustrated in the right column of FIG. 1, compared to prior approaches schematically illustrated in the left column of FIG. 1. The steps set forth in the right column of FIG. 1 are further described below.

Figure 2:
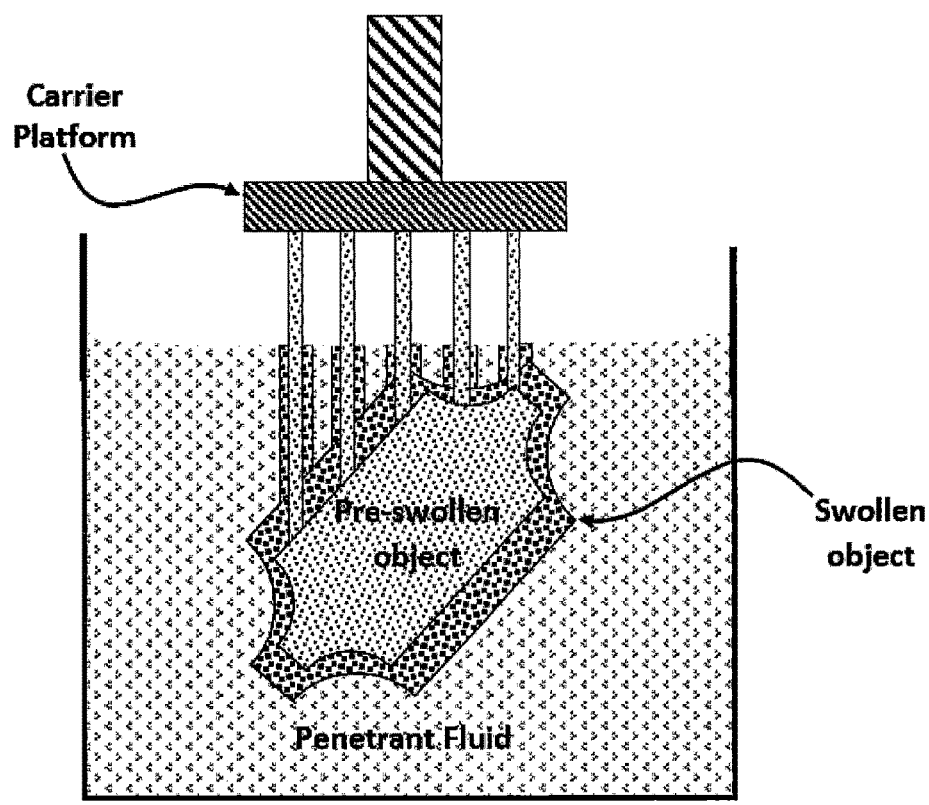
FIG. 2 illustrates an embodiment of the invention in which the object is partially immersed, and partially swollen, in the penetrant fluid.

FIG. 2 illustrates one embodiment of the present invention, in which the object comprises a main body, and fabrication supports (generally removed as discussed below). The object is fabricated on a carrier platform, to which the intervening supports are adhered. Here the object is partially contacted to the penetrating liquid, with the result being that the object main body, and portions of the fabrication supports, are swollen, but portions of the supports remain unswollen (facilitating at least in part their subsequent removal).

I. Polymerizable Liquids Containing Part a Components.

Dual cure systems as described herein may include a first curable system (sometimes referred to as "Part A" herein) that is curable by actinic radiation, typically light, and in some embodiments ultraviolet (UV) light. Any suitable polymerizable liquid can be used as the first component. The liquid (sometimes also referred to as "liquid resin" "ink," or simply "resin" herein) can include a monomer, particularly photopolymerizable and/or free radical polymerizable monomers, a suitable initiator such as a free radical initiator, or combination(s) thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cute site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968 A1; CN 102715751 A; JP 2012210408 A.

Acid catalyzed polymerizable liquids. While in some embodiments as noted above the polymerizable liquid comprises a free radical polymerizable liquid (in which case an inhibitor may be oxygen as described below), in other embodiments the polymerizable liquid comprises an acid catalyzed, or cationically polymerized, polymerizable liquid. In such embodiments the polymerizable liquid comprises monomers containing groups suitable for acid catalysis, such as epoxide groups, vinyl ether groups, etc. Thus, suitable monomers include olefins such as methoxyethene, 4-methoxystyrene, styrene, 2-methylprop-1-ene, 1,3-butadiene, etc.; heterocyclic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also Photoacid Generator Selection Guide for the electronics industry and energy curable coatings (BASF 2010).

Hydrogels. In some embodiments suitable resins includes photocurable hydrogels such as poly(ethylene glycols) (PEG) and gelatins. PEG hydrogels have been used to deliver a variety of biologicals, including growth factors. However, a great challenge facing PEG hydrogels cross-linked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions prior to photopolymerization, allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Photocurable silicone resins. A suitable resin includes photocurable silicones. UV cure silicone rubber, such as Siliopren™ UV Cure Silicone Rubber can be used as can LOCTITE™ Cure Silicone adhesives sealants. Applications include optical instruments, medical and surgical equipment, exterior lighting and enclosures, electrical connectors / sensors, fiber optics, gaskets, and molds.

Biodegradable resins. Biodegradable resins are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG di(meth)acrylate to yield a transparent resin suitable for use. Polycaprolactone and PLGA oligomers can be functionalized with acrylic or methacrylic groups to allow them to be effective resins for use.

Photocurable polyurethanes. A particularly useful resin is photocurable polyurethanes (including polyureas, and copolymers of polyurethanes and polyureas (e.g., poly(urethane-urea)). A photopolymerizable polyurethane/polyurea composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

High performance resins. In some embodiments, high performance resins are used. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, and fluoroenone initiators (including derivatives thereof), to initiate cross-linking on irradiation, as discussed further below.

Additional example resins. Particularly useful resins for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM140IV High Temperature Mold Material for use directly with vulcanized rubber in molding / casting applications. A particularly useful material for making tough and stiff parts includes EnvisionTEC's RC31 resin. Particularly useful resin for investment casting applications include EnvisionTEC's Easy Cast EC500 resin and MadeSolid FireCast resin.

Additional resin ingredients. The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be non-conductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 μm average diameter).

The particles can comprise an active agent or detectable compound as described below, though these may also be provided dissolved solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Non-reactive light absorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxypenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Inhibitors of polymerization. Inhibitors or polymerization inhibitors for use in the present invention may be in the form of a liquid or a gas. In some embodiments, gas inhibitors are preferred. In some embodiments, liquid inhibitors such as oils or lubricants (e.g., fluorinated oils such as perfluoropolyethers) may be employed, as inhibitors (or as release layers that maintain a liquid interface). The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g., methyl amine, ethyl amine, di and trialkyl amines such as dimethyl amine, diethyl amine, trimethyl amine, triethyl amine, etc.), or carbon dioxide, including mixtures or combinations thereof.

Polymerizable liquids carrying live cells. In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556,490; 6,602,975; 5,836,313; etc.

Oxidizable tin salts. In some embodiments, the polymerizable liquid contains an oxidizable tin salt. Suitable salts for carrying out the present invention include, but are not limited to, stannous butanoate, stannous octoate, stannous hexanoate, stannous heptanoate, stannous linoleate, stannous phenyl butanoate, stannous phenyl stearate, stannous phenyl oleate, stannous nonanoate, stannous decanoate, stannous undecanoate, stannous dodecanoate, stannous stearate, stannous oleate stannous undecenoate, stannous 2-ethylhexoate, dibutyl tin dilaurate, dibutyl tin dioleate, dibutyl tin distearate, dipropyl tin dilaurate, dipropyl tin dioleate, dipropyl tin distearate, dibutyl tin dihexanoate, and combinations thereof. See also U.S. Pat. Nos. 5,298,532; 4,421,822; and 4,389,514, the disclosures of which are incorporated herein by reference. In addition to the foregoing oxidizable tin salts, Lewis acids such as those described in Chu et al. in Macromolecular Symposia, Volume 95, Issue 1, pages 233-242, June 1995 are known to enhance the polymerization rates of free-radical polymerizations and are included herein by reference.

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. See generally US Patent Application Publication No. 20150215430. The toughener may be uniformly distributed in the form of particles in the cured product. The particles could be less than 5 microns (μm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization. Examples of block copolymers include the copolymers whose composition is described in U.S. Pat. No. 6,894,113 (Court et al., Atofina, 2005) and include "NANOSTRENTH®" SBM (polystyrene-polybutadiene-polymethacrylate), and AMA (polymethacrylate-polybutylacrylate-polymethacrylate), both produced by Arkema. Other suitable block copolymers include FORTEGRA™ and the amphiphilic block copolymers described in U.S. Pat. No. 7,820,760, assigned to Dow Chemical. Examples of known core-shell particles include the core-shell (dendrimer) particles whose compositions are described in US20100280151 (Nguyen et al., Toray Industries, Inc., 2010) for an amine branched polymer as a shell grafted to a core polymer polymerized from polymerizable monomers containing unsaturated carbon-carbon bonds, core-shell rubber particles whose compositions are described in EP 1632533A1 and EP 2123711A1 by Kaneka Corporation, and the "KaneAce MX" product line of such particle/epoxy blends whose particles have a polymeric core polymerized from polymerizable monomers such as butadiene, styrene, other unsaturated carbon-carbon bond monomer, or their combinations, and a polymeric shell compatible with the epoxy, typically polymethylmethacrylate, polyglycidylmethacrylate, polyacrylonitrile or similar polymers, as discussed further below. Also suitable as block copolymers in the present invention are the "JSR SX" series of carboxylated polystyrene/polydivinylbenzenes produced by JSR Corporation; "Kureha Paraloid" EXL-2655 (produced by Kureha Chemical Industry Co., Ltd.), which is a butadiene alkyl methacrylate styrene copolymer; "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which are butyl acrylate methyl methacrylate copolymers. Examples of suitable oxide particles include NANOPDX® produced by nanoresins AG. This is a master blend of functionalized nanosilica particles and an epoxy.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere.

In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle.

In some embodiments, the rubbery core can have a glass transition temperature (Tg) of less than $-25\,°$ C., more preferably less than $-50\,°$ C., and even more preferably less than $-70\,°$ C. The Tg of the rubbery core may be well below $-100\,°$ C. The core-shell rubber also has at least one shell portion that preferably has a Tg of at least $50\,°$ C. By "core," it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material can be grafted onto the core or is cross-linked. The rubbery core may constitute from 50 to 95%, or from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized monounsaturated monomers such as styrene, vinyl acetate, vinyl chloride, methyl methacrylate, and the like. The core polymer is optionally cross-linked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below $-100\,°$ C. Core-shell rubbers having a silicone rubber core include those commercially available from Wacker Chemie, Munich, Germany, under the trade name Genioperl®.

The shell polymer, which is optionally chemically grafted or cross-linked to the rubber core, can be polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer can be between 20,000 and 500,000.

One suitable type of core-shell rubber has reactive groups in the shell polymer which can react with an epoxy resin or an epoxy resin hardener. Glycidyl groups are suitable. These can be provided by monomers such as glycidyl methacrylate.

One example of a suitable core-shell rubber is of the type described in US Patent Application Publication No. 2007/0027233 (EP 1 632 533 A1). Core-shell rubber particles as described therein include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in the document.

Suitable core-shell rubbers include, but are not limited to, those sold by Kaneka Corporation under the designation Kaneka Kane Ace, including the Kaneka Kane Ace 15 and 120 series of products, including Kaneka Kance Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

II. Methods of Making Intermediates.

The three-dimensional intermediate is preferably formed from resins as described above by additive manufacturing, typically bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, and US Patent Application Publication No. 2013/0295212 to Chen et al. The disclosures of these patents and applications are incorporated by reference herein in their entirety.

In general, top-down three-dimensional fabrication is carried out by:

(a) providing a polymerizable liquid reservoir having a polymerizable liquid fill level and a carrier positioned in the reservoir, the carrier and the fill level defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light to form a solid polymer scaffold from the first component and also advancing (typically lowering) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

A wiper blade, doctor blade, or optically transparent (rigid or flexible) window, may optionally be provided at the fill level to facilitate leveling of the polymerizable liquid, in accordance with known techniques. In the case of an optically transparent window, the window provides a build surface against which the three-dimensional intermediate is formed, analogous to the build surface in bottom-up three-dimensional fabrication as discussed below.

In general, bottom-up three-dimensional fabrication is carried out by:

(a) providing a carrier and an optically transparent member having a build surface, the carrier and the build surface defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light through said optically transparent member to form a solid polymer scaffold from the first component and also advancing (typically raising) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

In some embodiments of bottom-up or top-down three-dimensional fabrication as implemented in the context of the present invention, the build surface is stationary during the formation of the three-dimensional intermediate; in other embodiments of bottom-up three-dimensional fabrication as implemented in the context of the present invention, the build surface is tilted, slid, flexed and/or peeled, and/or otherwise translocated or released from the growing three-dimensional intermediate, usually repeatedly, during formation of the three-dimensional intermediate.

In some embodiments of bottom-up or top-down three-dimensional fabrication as carried out in the context of the present invention, the polymerizable liquid (or resin) is maintained in liquid contact with both the growing thee dimensional intermediate and the build surface during both the filling and irradiating steps, during fabrication of some of, a major portion of, or all of the three-dimensional intermediate.

In some embodiments of bottom-up or top-down three-dimensional fabrication as carried out in the context of the present invention, the growing three-dimensional intermediate is fabricated in a layerless manner (e.g., through multiple exposures or "slices" of patterned actinic radiation or light) during at least a portion of the formation of the three-dimensional intermediate.

In some embodiments of bottom-up or top-down three-dimensional fabrication as carried out in the context of the present invention, the growing three-dimensional intermediate is fabricated in a layer-by-layer manner (e.g., through multiple exposures or "slices" of patterned actinic radiation or light), during at least a portion of the formation of the three-dimensional intermediate.

In some embodiments of bottom-up or top-down three-dimensional fabrication employing a rigid or flexible optically transparent window, a lubricant or immiscible liquid may be provided between the window and the polymerizable liquid (e.g., a fluorinated fluid or oil such as a perfluoropolyether oil).

From the foregoing it will be appreciated that, in some embodiments of bottom-up or top-down three-dimensional fabrication as carried out in the context of the present invention, the growing three-dimensional intermediate is fabricated in a layerless manner during the formation of at least one portion thereof, and that same growing three-dimensional intermediate is fabricated in a layer-by-layer manner during the formation of at least one other portion thereof. Thus, operating mode may be changed once, or on multiple occasions, between layerless fabrication and layer-by-layer fabrication, as desired by operating conditions such as part geometry.

In preferred embodiments, the intermediate is formed by continuous liquid interface production (CLIP). CLIP is known and described in, for example, PCT Application Nos. PCT/US2014/015486 (also published as U.S. Pat. No. 9,211, 678); PCT/US2014/015506 (also published as U.S. Pat. No. 9,205,601), PCT/US2014/015497 (also published as U.S. Pat. No. 9,216,546), and in J. Tumbleston, D. Shirvanyants, N. Ermoshkin et al., Continuous liquid interface production of 3D Objects, Science 347, 1349-1352 (2015). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Additional examples of CLIP may be found in, e.g., Batchelder et al., US 2017/0129169 (Stratasys), and Sun et al., US 2016/0288376 (Dentsply).

In some embodiments, the stable liquid interface may be achieved by other techniques, such as by providing an immiscible liquid as the build surface between the polymerizable liquid and the optically transparent member, by feeding a lubricant to the build surface (e.g., through an optically transparent member which is semipermeable thereto, and/or serves as a reservoir thereof), etc.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or the gradient of polymerization zone and the dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

Inhibitors, or polymerization inhibitors, for use in the present invention may be in the form of a liquid or a gas. In some embodiments, gas inhibitors are preferred. In some embodiments, liquid inhibitors such as oils or lubricants may be employed. In further embodiments, gas inhibitors which are dissolved in liquids (e.g., oils or lubricants) may be employed. For example, oxygen dissolved in a fluorinated fluid. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g., methyl amine, ethyl amine, di and trialkyl amines such as dimethyl amine, diethyl amine, trimethyl amine, triethyl amine, etc.), or carbon dioxide, including mixtures or combinations thereof.

The method may further comprise the step of disrupting the gradient of polymerization zone for a time sufficient to form a cleavage line in the three-dimensional object (e.g., at a predetermined desired location for intentional cleavage, or at a location in the object where prevention of cleavage or reduction of cleavage is non-critical), and then reinstating the gradient of polymerization zone (e.g. by pausing, and resuming, the advancing step, increasing, then decreasing, the intensity of irradiation, and combinations thereof).

CLIP may be carried out in different operating modes (that is, different manners of advancing the carrier and build surface away from one another), including continuous, intermittent, reciprocal, and combinations thereof Thus in some embodiments, the advancing step is carried out continuously, at a uniform or variable rate, with either constant or intermittent illumination or exposure of the build area to the light source.

In other embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.).

In some embodiments, the rate of advance (whether carried out sequentially or continuously) is from about 0.1, 1, or 10 microns per second, up to about to 100, 1,000, or 10,000 microns per second, again depending again depending on factors such as temperature, pressure, structure of the article being produced, intensity of radiation, etc.

In still other embodiments, the carrier is vertically reciprocated with respect to the build surface to enhance or speed the refilling of the build region with the polymerizable liquid. In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

In some embodiments, the solidifiable or polymerizable liquid is changed at least once during the method with a subsequent solidifiable or polymerizable liquid (e.g., by switching a "window" or "build surface" and associated reservoir of polymerizable liquid in the apparatus); optionally where the subsequent solidifiable or polymerizable liquid is cross-reactive with each previous solidifiable or polymerizable liquid during the subsequent curing, to form an object having a plurality of structural segments covalently coupled to one another, each structural segment having different structural (e.g., tensile) properties (e.g., a rigid funnel or liquid connector segment, covalently coupled to a flexible pipe or tube segment).

Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Once the three-dimensional intermediate is formed, it may be removed from the carrier and washed as discussed below. Before or after washing, or after the further curing (such as by heating and/or microwave irradiating), any supports can be removed, and/or any other modifications optionally made (cutting, welding, adhesively bonding, joining, grinding, drilling, etc.).

III. Part B Components for Delivery in Penetrant Fluid

As noted above, in some embodiments of the invention, the polymerizable liquid comprises a first light polymerizable component (sometimes referred to as "Part A" herein). The polymerizable liquid may optionally but preferably also contain a member of a reactive pair, which reactive pair solidifies by another mechanism, or in a different manner from, the first component (these components together sometimes referred to as "Part B" herein), typically by further reacting, polymerizing, or chain extending. Numerous embodiments thereof may be carried out. In the following, note that, where particular acrylates such as methacrylates are described, other acrylates may also be used.

Part A chemistry. As noted above, in some embodiments of the present invention, a resin will have a first component, termed "Part A." Part A comprises or consists of a mixture of monomers and/or prepolymers that can be polymerized by exposure to actinic radiation or light. This resin can have a functionality of 2 or higher (though a resin with a functionality of 1 can also be used when the polymer does not dissolve in its monomer). A purpose of Part A is to "lock" the shape of the object being formed or create a scaffold for the one or more additional components (e.g., Part B). Importantly, Part A is present at or above the minimum quantity needed to maintain the shape of the object being formed after the initial solidification. In some embodiments, this amount corresponds to less than ten, twenty, or thirty percent by weight of the total resin (polymerizable liquid) composition.

In some embodiments, Part A can react to form a cross-linked polymer network or a solid homopolymer.

Examples of suitable reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

An aspect of the solidification of Part A is that it provides a scaffold in which a second reactive resin component, termed "Part B," can solidify during a second step (which may occur concurrently with or following the solidification of Part A). This secondary reaction preferably occurs without significantly distorting the original shape defined during the solidification of Part A. Alternative approaches would lead to a distortion in the original shape in a desired manner.

In particular embodiments, when used in the methods and apparatus described herein, the solidification of Part A is continuously inhibited during printing within a certain region, by oxygen or amines or other reactive species, to form a liquid interface between the solidified part and an inhibitor-permeable film or window (e.g., is carried out by continuous liquid interphase/interface printing).

Part B chemistry. Part B may comprise, consist of or consist essentially of a mix of monomers and/or prepolymers that possess reactive end groups that participate in a second solidification reaction after the Part A solidification reaction. Examples of methods used to solidify Part B include, but are not limited to, contacting the object or scaffold to heat, water or water vapor, light at a different wavelength than that at which Part A is cured, catalysts, (with or without additional heat), evaporation of a solvent from the polymerizable liquid (e.g., using heat, vacuum, or a combination thereof), microwave irradiation, etc., including combinations thereof.

Examples of suitable reactive end group pairs suitable for Part B constituents, monomers or prepolymers include, but are not limited to: epoxy/amine, epoxy/hydroxyl, oxetane/amine, oxetane/alcohol, isocyanate*/hydroxyl, isocyanate*/amine, isocyanate/carboxylic acid, anhydride/amine, amine/carboxylic acid, amine/ester, hydroxyl/carboxylic acid, hydroxyl/acid chloride, amine/acid chloride, vinyl/Si—H (hydrosilylation), Si—Cl /hydroxyl, Si—Cl/amine, hydroxyl/aldehyde, amine/aldehyde, hydroxymethyl or alkoxymethyl amide/alcohol, aminoplast, alkyne/Azide (also known as one embodiment of "Click Chemistry," along with additional reactions including thiolene, Michael additions, Diels-Alder reactions, nucleophilic substitution reactions, etc.), alkene/Sulfur (polybutadiene vulcanization), alkene/peroxide, alkene/thiol, alkyne/thiol, hydroxyl/halide, isocyanate*/water (polyurethane foams), Si—OH/hydroxyl, Si—OH/water, Si—OH/Si—H (tin catalyzed silicone), Si—OH/Si—OH (tin catalyzed silicone), Perfluorovinyl (coupling to form perfluorocyclobutane), etc., where *isocyanates include protected isocyanates (e.g., oximes)), diene/dienophiles for Diels-Alder reactions, olefin metathesis polymerization, olefin polymerization using Ziegler-Natta catalysis, ring-opening polymerization (including ring-opening olefin metathesis polymerization, lactams, lactones, Siloxanes, epoxides, cyclic ethers, imines, cyclic acetals, etc.), etc. Additional examples of suitable "Part B" components that may be incorporated into the penetrant fluid include, but are not limited to, those set forth in J. Rolland et al., U.S. Pat. No. 9,453,142, the disclosure of which is incorporated herein by reference.

As will be noted from the above, the "Part B" components generally comprise at least a pair of compounds, reactive with one another (e.g., a polyisocyanate, and a polyamine).

IV. Contacting of Intermediate to Penetrant and Second Cure.

When desired, contacting of the intermediate to the penetrant fluid or liquid (e.g., by full or partial immersion, spraying, etc., may be carried out by any suitable technique, aided with any suitable apparatus, including but not limited to those described in U.S. Pat. No. 5,248,456, the disclosure of which is incorporated herein by reference.

Penetrant fluids or liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The penetrant fluid may be in any suitable form, such as a solution, emulsion, dispersion, etc.

Examples of organic solvents that may be used as a penetrant fluid, or as a constituent thereof, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

Examples of alcohol organic solvents that may be used in the present invention include, but are not limited to, aliphatic and aromatic alcohols such as 2-ethyl hexanol, glycerol, cyclohexanol, ethylene glycol, propylene glycol, di-propylene glycol, 1,4-butanediol, isoamyl alcohol, 1,2-propanediol, 1,3-propanediol, benzyl alcohol, 2-pentanol, 1-butanol, 2-butanol, methanol, ethanol, t-butanol, 2-propanol, 1-propanol, 2-methoxyethanol, tetrahydrofuryl alcohol, benzyl alcohol, etc., including combinations thereof.

Examples of ester organic solvents that may be used to carry out the present invention include, but are not limited to, t-butyl acetate, n-octyl acetate, butyl acetate, ethylene carbonate, propylene carbonate, butylene carbonate, glycerol carbonate, isopropyl acetate, ethyl lactate, propyl acetate, dimethyl carbonate, methyl lactate, ethyl acetate, ethyl propionate, methyl acetate, ethyl formate etc., including combinations thereof.

Examples of dibasic ester organic solvents include, but are not limited to, dimethyl esters of succinic acid, glutaric acid, adipic acid, etc., including combinations thereof.

Examples of ketone organic solvents that may be used to carry out the present invention include, but are not limited to, cyclohexanone, cyclopentanone, 2-pentanone, 3-pentanone, methylisobutyl ketone, acetone, methylethyl ketone, etc., including combinations thereof.

Examples of acid organic solvents that may be used to carry out the present invention include, but are not limited to, propionic acid, acetic anhydride, acetic acid, etc., including combinations thereof.

Examples of aromatic organic solvents that may be used to carry out the present invention include, but are not limited to, mesitylene, cumene, p-xylene, toluene, benzene, etc., including combinations thereof.

Examples of hydrocarbon (i.e., aliphatic) organic solvents that may be used to carry out the present invention include, but are not limited to, cis-decalin, ISOPAR™ G, isooctane, methyl cyclohexane, cyclohexane, heptane, pentane, methylcyclopentane, 2-methylpentane, hexane, petroleum spirit, etc., including combinations thereof.

Examples of ether organic solvents that may be used to carry out the present invention include, but are not limited to, di(ethylene glycol), ethoxybenzene, tri(ethylene glycol), sulfolane, DEG monobutyl ether, anisole, diphenyl ether, dibutyl ether, t-amyl methyl ether, t-butylmethyl ether, cyclopentyl methyl ether, t-butyl ethyl ether, 2-methyltetrahydrofuran, diethyl ether, bis(2-methoxyethyl) ether, dimethyl ether, 1,4-dioxane, tetrahydrofuran, 1,2-dimethoxyethane, diisopropyl ether, etc., including combinations thereof.

Examples of dipolar aprotic organic solvents that may be used to carry out the present invention include, but are not limited to, dimethylpropylene urea, dimethyl sulphoxide, formamide, dimethyl formamide, N-methylformamide, N-methyl pyrrolidone, propanenitrile, dimethyl acetamide, acetonitrile, etc., including combinations thereof.

Examples of halogenated organic solvents that may be used to carry out the present invention include, but are not limited to, 1,2-dichlorobenzene, 1,2,4-trichlorobenzene, chlorobenzene, trichloroacetonitrile, chloroacetic acid, trichloroacetic acid, perfluorotoluene, perfluorocyclohexane, carbon tetrachloride, dichloromethane, perfluorohexane, fluorobenzene, chloroform, perfluorocyclic ether, trifluoroacetic acid, trifluorotoluene, 1,2-dichloroethane, 2,2,2-trifluoroethanol, etc., including combinations thereof.

Examples of base organic solvents that may be used to carry out the present invention include, but are not limited to, N,N-dimethylaniline, triethylamine, pyridine, etc., including combinations thereof Examples of other organic solvents that may be used to carry out the present invention include, but are not limited to, nitromethane, carbon disulfide, etc., including combinations thereof.

Examples of surfactants include, but are not limited to, anionic surfactants (e.g., sulfates, sulfonatse, carboxylates, and phosphate esters), cationic surfactants, zwitterionic surfactants, nonionic surfactants, etc., including combinations thereof Common examples include, but are not limited to, sodium stearate, linear alkylbenzenesulfonates, lignin sulfonates, fatty alcohol ethoxylates, alkylphenol ethoxylates, etc., including combinations thereof Numerous examples additional examples of suitable surfactants are known, some of which are described in U.S. Pat. Nos. 9,198,847, 9,175,248, 9,121,000, 9,120,997, 9,095,787, 9,068,152, 9,023,782, and 8,765,108.

Examples of chelants (chelating agents) include, but are not limited to, ethylenediamine tetraacetic acid, phosphates, nitrilotriacetic acid (NTA), citrates, silicates, and polymers of acrylic and maleic acid.

Examples of enzymes that may be included in the penetrant fluid include, but are not limited to, proteases, amylases, lipases, cellulases, etc., including mixtures thereof. See, e.g., U.S. Pat. Nos. 7,183,248, 6,063,206, In some embodiments, the penetrant fluid can be an aqueous solution of ethoxylated alcohol, sodium citrate, tetrasodium N,N-bis(carboxymethyl)-L-glutamate, sodium carbonate, citric acid, and isothiazolinone mixture. One particular example thereof is SIMPLE GREEN® all purpose cleaner (Sunshine Makers Inc., Huntington Beach, Calif., USA) used per se or mixed with additional water.

In some embodiments, the penetrant fluid can be an aqueous solution comprised of 2-butoxyethanol, sodium metasilicate, and sodium hydroxide. One particular example thereof is PURPLE POWER™ degreaser/cleaner (Aiken Chemical Co., Greenville, S.C., USA), used per se or mixed with additional water.

In some embodiments, the penetrant fluid can be ethyl lactate, alone or with a co-solvent. One particular example thereof is BIO-SOLV™ solvent replacement (Bio Brands LLC, Cinnaminson, N.J., USA), used per se or mixed with water.

In some embodiments, the penetrant fluid consists of a 50:50 (volume:volume) solution of water and isopropanol.

After the intermediate is washed and then separated from or removed from the penetrant fluid, it can optionally be dried (e.g., air dried) and/or rinsed (in any sequence). It is then further cured, such as by heating and/or microwave irradiating, contacting to water and/or a further catalyst, etc., including combinations thereof.

Heating may be active heating (e.g., in an oven, such as an electric, gas, or solar oven), or passive heating (e.g., at ambient (room) temperature). Active heating will generally be more rapid than passive heating and in some embodiments is preferred, but passive heating—such as simply maintaining the intermediate at ambient (room) temperature for a sufficient time to effect further cure—is in some embodiments preferred.

In some embodiments, the heating step is carried out at least a first (oven) temperature and a second (oven) temperature, with the first temperature greater than ambient (room) temperature, the second temperature greater than the first temperature, and the second temperature less than 300° C. (e.g., with ramped or step-wise increases between ambient (room) temperature and the first temperature, and/or between the first temperature and the second temperature). In some embodiments, the heating step is carried out at at least a first (oven) temperature and a second (oven) temperature, with the first temperature greater than ambient (room) temperature, the second temperature greater than the first temperature, and the second temperature less than 300° C. (e.g., with ramped or step-wise increases between ambient (room) temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient (room) temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

V. Objects Produced.

The methods of the present invention can be used to make a variety of useful articles having a variety of mechanical properties, including but not limited to those articles and those properties described in U.S. Pat. No. 9,453,142 to Rolland et al., the disclosure of which is incorporated herein by reference.

In some embodiments, the three-dimensional (3D) object comprises a polymer blend, interpenetrating polymer network, semi-interpenetrating polymer network, or sequential interpenetrating polymer network formed from said first component and said second component.

In some embodiments, the three-dimensional object is (i) rigid, (ii) semi-rigid and flexible, or (iii) elastomeric.

The three-dimensional object can be (i) uniform or symmetric in shape, or (ii) irregular or asymmetric in shape.

The structural properties of the 3D formed object may be selected together with the properties of the materials from which the 3D object is formed to provide a wide range of properties for the 3D object. Dual cure materials and methods described above in the present application may be used to form complex shapes with desired material properties to form a wide range of 3D objects.

In some embodiments, 3D formed objects may be rigid and have, for example, a Young's modulus (MPa) in the range of about 800 to 3500 or any range subsumed therein, a Tensile Strength (MPa) in the range of about 30 to 100 or any range subsumed therein, and/or a percent elongation at break in the range of about 1 to 100 or any range subsumed therein. Non-limiting examples of such rigid 3D formed objects may include fasteners; electronic device housings; gears, propellers, and impellers; wheels, mechanical device housings; tools and other rigid 3D objects.

In some embodiments, 3D formed objects may be semi-rigid and have, for example, a Young's modulus (MPa) in the range of about 300-2500 or any range subsumed therein, a Tensile Strength (MPa) in the range of about 20-70 or any range subsumed therein, and/or a percent elongation at break in the range of about 40 to 300 or 600 or any range subsumed therein. Non-limiting examples of such rigid 3D formed objects may include structural elements; hinges including living hinges; boat and watercraft hulls and decks; wheels; bottles, jars and other containers; pipes, liquid tubes and connectors and other semi-rigid 3D objects.

In some embodiments, 3D formed objects may be elastomeric and have, for example, a Young's modulus (MPa) in the range of about 0.5-40 or any range subsumed therein, a Tensile Strength (MPa) in the range of about 0.5-30 or any range subsumed therein, and/or a percent elongation at break in the range of about 50-1000 or any range subsumed therein. Non-limiting examples of such rigid 3D formed objects may include foot-wear soles, heels, innersoles and midsoles; bushings and gaskets; cushions; electronic device housings and other elastomeric 3D objects.

In some example embodiments, the process of fabricating the product may be paused or interrupted one or more times, to change the polymerizable liquid. In example embodiments, 3D formed objects may include multiple materials (which may, for example, be a thermoplastic or thermoset polyurethane, polyurea, or copolymer thereof) with different tensile strengths. While a fault line or plane may be formed in the intermediate by the interruption, if the subsequent polymerizable liquid is, in its second cure material, reactive with that of the first, then the two distinct segments of the intermediate will cross-react and covalently couple to one another during the second cure (e.g., by heating or microwave irradiation). Thus, for example, any of the materials described herein may be sequentially changed to form a product having multiple distinct segments with different tensile properties, while still being a unitary product with the different segments covalently coupled to one another. In some embodiments, a 3D object may be formed with a plurality of regions with different materials and properties. For example, a 3D formed object could have one or more regions formed from a first material or first group of one or more materials having a Tensile Strength (MPa) in the range of about 30-100 or any range subsumed therein, and/or one or more regions formed from a second material or second group of one or more materials having a Tensile Strength (MPa) in the range of about 20-70 or any range subsumed therein and/or one or more regions formed from a third material or third group of one or more materials having a Tensile Strength (MPa) in the range of about 0.5-30 or any range subsumed therein or any combination of the foregoing. For example, the 3D object could have from 1-10 or more different regions (or any range subsumed therein) with varying tensile strength selected from any of the materials and tensile strengths described above. For example, a hinge can be formed, with the hinge comprising a rigid segment, coupled to a second elastic segment, coupled to a third rigid segment, by sequentially changing polymerizable liquids during the formation of the three-dimensional intermediate. A shock absorber or vibration dampener can be formed in like manner, with the second segment being either elastic or semi-rigid. A unitary rigid funnel and flexible hose assembly can be formed in like manner.

Embodiments of the present invention are explained in greater detail in the following non-limiting examples.

EXAMPLE 1

Preparation of (Meth)Acrylate Blocked Polyurethane (ABPU-20)

ABPU-20 is prepared in accordance with known techniques (see, e.g., J. Rolland et al., U.S. Pat. No. 9,453,142 at column 40, lines 25-52). Briefly, a prepolymer is produced by reaction of polytetramethylene oxide (PTMO) with hydrogenated methylene diphenyl diisocyanate (HMDI) in the presence of stannous octoate catalyst, and the isocyanate groups of that prepolymer are then terminated with t-butylaminoethyl methacrylate (TBAEMA). The PTMO used has a molecular weight of 2,000 daltons, and the HMDI and PTMO are combined in a molar ratio of about 2.4:1 (HMDI: PTMO). ABPU-20 is used to prepare the resin described in Example 2 below.

EXAMPLE 2

Dual Cure Polyurethane Resin Containing "Part A" Only

A resin was prepared by combining the following ingredients in the following percent by weight amounts.

| Neat | Percent by weight |
| --- | --- |
| (meth) acrylate blocked polyurethane (ABPU-20) | 68.37 |
| Lauryl methacrylate | 14.95 |
| di(ethylene glycol) methyl ether methacrylate (DEGMA) | 7.48 |
| Polyethylene glycol 600 dimethacrylate (PEG600DMA) | 7.39 |
| Diphenyl(2,4,6-trimethylbenzoyl)phosphine oxide | 1.07 |
| 2-(3'-tert-butyl-2'-hydroxy-5'-methylphenyl)-5-chlorobenzotriazole | 0.05 |
| White Pigment (IdeOn LLC) | 0.43 |
| Yellow Pigment (Sun Chemical) | 0.26 |
| Total | 100.00 |

As discussed further below, one of the "Part B" components for objects made with this resin will be a polyamine, specifically, 4,4'-methylenebis(2-methylcyclohexyl-amine) (MACM).

COMPARATIVE EXAMPLE A

Dual Cure Polyurethane Resin Containing Both "Part A" and "Part B"

For the comparisons described below, a "control" resin containing MACM was also prepared, with the MACM included in an amount to stoichiometrically match the amine groups with the "blocked" isocyanate groups (see "mixed A+B" in FIG. 3 below).

EXAMPLE 3

Production of Intermediate Three-Dimensional Objects

A set of three-dimensional objects of the same size and configuration are produced with a resin as described in Example 2 above by continuous liquid interface production on a Carbon M1 apparatus, commercially available from Carbon, 1089 Mills Way Redwood City, Calif. 94063 USA. See also U.S. Pat. Nos. 9,211,678 and 9,205,601, the disclosures of which are incorporated by reference herein in their entirety.

EXAMPLE 4

Penetrant Fluid containing "Part B"

The penetrant fluid is in this Example a liquid comprised of simply acetone and MACM (as a "Part B" constituent). The acetone is a delivery solvent for the MACM and allows the concentration of MACM in the intermediate three-dimensional object to be tuned by changing the concentration of MACM in the acetone. Various concentrations of MACM in the acetone are discussed further below.

EXAMPLE 5

Treatment of Intermediate Objects with Penetrant and Baking

An intermediate object produced as described above is contacted by immersion to a penetrant fluid as described above, and the intermediate object undergoes swelling. The duration of the contacting step is not critical, but is preferably sufficiently long to achieve equilibrium of the MACM concentration in the intermediate object (for example, 6 to 12 hours at room temperature). The intermediate objects are then removed from the penetrant fluid, left out at room temperature for 2 to 4 hours to allow the acetone to evaporate, and then baked at 120 degrees Centigrade for 4 hours.

EXAMPLE 6

Testing of Tensile Properties

In the examples below, tensile properties were tested in accordance with ASTM standard D412, *Standard Test Methods for Vulcanized Rubber and Thermoplastic Elastomers—Tension* (ASTM International, 100 Barr Harbor Drive, PO Box C700, West Conshohocken, Pa. 19428-2959 USA). See also Rolland et al., U.S. Pat. No. 9,453,142, at Example 18 and thereafter.

EXAMPLE 7

Comparative Test Results

Figure 3:
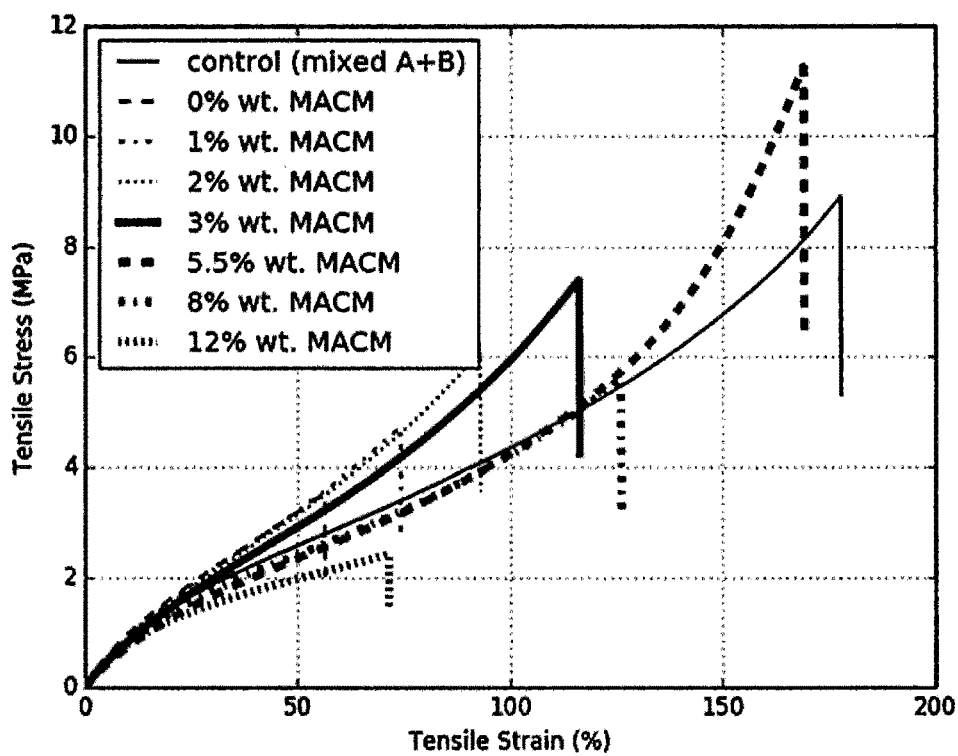
FIG. 3 graphically illustrates various tensile properties of products produced by the process of the present invention.

Objects produced as described above in D412 Type IV dog-bone-shaped specimens were treated with a penetrant fluid containing different concentrations MACM as indicated in FIG. 3 and baked as described above. After baking, the objects were tested in accordance with ASTM standard D412 on an Instron apparatus. Data are given in FIG. 3. As can be seen from that Figure, the stress vs strain behavior of parts produced in accordance with the present invention is similar to, and in some cases closely resembles, that of objects produced with a resin containing both parts A and B, particularly when the concentration of part B in the penetrant fluid is optimized.

EXAMPLE 8

Alternate Penetrant fluids

A preliminary experiment was carried out in like manner as described in Examples 1-7 above, without repeated "scans" at different concentrations, and with tert-butyl methyl ether used as the penetrant fluid containing the MACM instead of acetone. Results similar to those described in the Examples above were obtained.

The foregoing is illustrative of the present invention, and is not to be construed as limiting thereof. The invention is defined by the following claims, with equivalents of the claims to be included therein.

That which is claimed is:

1. A method of forming a three-dimensional object, the method comprising:
    (a) forming a three-dimensional intermediate by polymerization of a polymerizable liquid in an additive manufacturing process, said polymerizable liquid comprising a light polymerizable component, and said three-dimensional intermediate having the same shape as, or a shape to be imparted to, said three-dimensional object;
    (b) contacting at least a portion of said three-dimensional intermediate to a penetrant fluid, said penetrant fluid carrying a solidifiable component, and said contacting step carried out under conditions in which said solidifiable component penetrates into said three-dimensional intermediate;
    (c) optionally separating said three-dimensional intermediate from said penetrant fluid; and
    (d) solidifying and/or curing said solidifiable component in said three-dimensional intermediate to form said three-dimensional object, wherein said three-dimensional intermediate comprise a first member of a reactive pair and said solidifiable component comprises a second member of said reactive pair which is not sufficient to solidify and/or cure in the absence of said first member.

2. The method of claim 1, wherein:
    said contacting step (b) is carried out under conditions in which said three-dimensional intermediate physically swells; and
    said separating step (c) and/or said solidifying and/or curing step (d) is carried out under conditions in which said three-dimensional intermediate physically shrinks.

3. The method of claim 1, wherein:
    said three-dimensional intermediate is elastic during said forming step; and/or
    at least a portion of said intermediate is in the configuration of a lattice or mesh.

4. The method of claim 1, wherein said polymerizable liquid is viscous at room temperature.

5. The method of claim 1, further comprising heating said polymerizable liquid during said forming step by an amount sufficient to reduce the viscosity thereof.

6. The method of claim 1, wherein said solidifying and/or curing step (d) is carried out by heating said three-dimensional intermediate for a time sufficient to produce said three-dimensional object.

7. The method of claim 1, wherein said forming step is carried out by bottom-up stereolithography.

8. The method of claim 7, wherein said bottom-up stereolithography comprises continuous liquid interface production.

9. The method of claim 1, wherein said penetrant fluid comprises an organic solvent.

10. The method of claim 1, wherein said penetrant fluid comprises water.

11. The method of claim 1, wherein said contacting step (b) is carried out at a temperature greater than ambient temperature, and/or at a pressure greater than atmospheric pressure.

12. The method of claim 1, wherein said penetrant fluid comprises a densified fluid.

13. The method of claim 1, wherein said penetrant fluid comprises carbon dioxide.

14. The method of claim 1, wherein:
    said polymerizable liquid and said three-dimensional intermediate comprise the first member of a reactive pair, and
    neither said first member nor said second member is sufficient to solidify and/or cure in the absence of the other.

15. The method of claim 1, wherein:
(i) said first member of said reactive pair comprises a polyisocyanate and said second member of said reactive pair comprises a polyol, polyamine, and/or polycarboxylic acid;
(ii) said first member of said reactive pair comprises an epoxy and said second member of said reactive pair comprises a polyol and/or polyamine; or
(iii) said first member of said reactive pair comprises an oxetane and said second member of said reactive pair comprises a polyamine.

16. The method of claim 1, wherein said solidifiable component comprises a precursor to: a polyurethane, polyurea, or copolymer thereof; a silicone resin; an epoxy resin; a cyanate ester resin; a natural rubber; a ring-opening metathesis polymerization resin; or a click chemistry resin.

17. The method of claim 1, wherein said solidifying and/or curing step (d) is carried out under conditions in which said intermediate degrades and forms a constituent necessary for the solidifying and/or curing of said solidifiable component.

18. The method of claim 1, wherein said solidifiable component is included in said penetrant fluid in an amount of from 1 percent by weight, up to 40 percent by weight.

19. The method of claim 1, wherein said contacting step (b) is carried out while said object is adhered to a carrier platform.

20. The method of claim 19, wherein said solidifying and/or curing step (d) is carried out after said object is removed from said carrier platform.

21. The method of claim 1, wherein said solidifying and/or curing step (d) is carried out by:
(i) heating and/or microwave irradiating said solidifiable component;
(ii) irradiating said solidifiable component with light at a defined wavelength;
(iii) contacting said solidifiable component to water; and/or
(iv) contacting said solidifiable component to a catalyst.

22. The method of claim 1, wherein said three-dimensional object comprises a polymer blend, interpenetrating polymer network, semi-interpenetrating polymer network, or sequential interpenetrating polymer network formed from said solidifiable component.

23. The method of claim 1, wherein said polymerization of said polymerizable liquid is exothermic.

24. The method of claim 1, wherein said forming step (a) is carried out by:
(i) providing a carrier and an optically transparent member having a build surface, said carrier and said build surface defining a build region therebetween;
(ii) filling said build region with said polymerizable liquid; and
(iii) irradiating said build region with light through said optically transparent member to form a solid polymer scaffold from said polymerizable component and also advancing said carrier and said build surface away from one another to form said three-dimensional intermediate.

25. The method of claim 24, wherein said irradiating and/or said advancing steps are carried out while also concurrently: continuously maintaining a dead zone of polymerizable liquid in contact with said build surface, and continuously maintaining a gradient of polymerization zone between said dead zone and said solid polymer scaffold and in contact with each thereof, said gradient of polymerization zone comprising said polymerizable liquid in partially cured form.

26. The method of claim 25, wherein said optically transparent member comprises a semipermeable member, and said continuously maintaining a dead zone is carried out by feeding an inhibitor of polymerization through said semipermeable member, thereby creating a gradient of the inhibitor in said dead zone and optionally in at least a portion of said gradient of polymerization zone.

27. The method of claim 26, wherein a gradient of the inhibitor is created in at least a portion of said gradient of polymerization zone.

28. The method of claim 26, wherein said optically transparent member comprises a fluoropolymer.

29. The method of claim 26, wherein said inhibitor comprises oxygen.

30. The method of claim 1, wherein said three-dimensional object is fabricated at a speed of at least 20 centimeters per hour.

31. The method of claim 1, wherein said optional step (c) is carried out.

* * * * *